United States Patent
Zhou et al.

(10) Patent No.: US 10,938,883 B2
(45) Date of Patent: *Mar. 2, 2021

(54) METHOD AND SYSTEM FOR CONTROLLING MEDIA INFORMATION DISPLAY ON MULTIPLE TERMINALS

(71) Applicant: Tencent Technology (Shenzhen) Company Limited, Shenzhen (CN)

(72) Inventors: Bin Zhou, Shenzhen (CN); Chen Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,698

(22) Filed: Aug. 29, 2019

(65) Prior Publication Data

US 2019/0387046 A1    Dec. 19, 2019

Related U.S. Application Data

(63) Continuation of application No. 14/818,705, filed on Aug. 5, 2015, now Pat. No. 10,440,095, which is a
(Continued)

(30) Foreign Application Priority Data

Jun. 21, 2013    (CN) .......................... 201310250081.6

(51) Int. Cl.
*H04L 29/08* (2006.01)
*G06F 3/14* (2006.01)
(Continued)

(52) U.S. Cl.
CPC .......... *H04L 67/025* (2013.01); *G06F 3/0484* (2013.01); *G06F 3/1454* (2013.01);
(Continued)

(58) Field of Classification Search
CPC ..... H04L 67/025; H04L 67/10; H04L 65/403; H04W 4/60; H04W 4/50; G06F 3/0484; G06F 3/1454
See application file for complete search history.

(56) References Cited

U.S. PATENT DOCUMENTS 9,513,793 B2 * 12/2016 Johansson ............. G06F 3/0486
2003/0193426 A1    10/2003 Vidal
(Continued)

FOREIGN PATENT DOCUMENTS

| CN | 101335586 A | 12/2008 |
|---|---|---|
| CN | 101945252 A | 1/2011 |

(Continued)

OTHER PUBLICATIONS

Tencent Technology, ISR, PCT/CN2014/079762, Sep. 26, 2014, 3 pgs.
(Continued)

*Primary Examiner* — Beau D Spratt
(74) *Attorney, Agent, or Firm* — Morgan, Lewis & Bockius LLP

(57) ABSTRACT

A method of facilitating an operating terminal to control media information displayed on target terminals using a computer server is disclosed. Upon receipt of a search request for target terminals within a local area network from an operating terminal, the computer server identifies a list of online terminals as the target terminals and returns the target terminals to the operating terminal. A user of the operating terminal then generates an operation instruction for controlling media information displayed on the target terminals. In response to the operation instruction, the computer server sends the operation instruction to respective applications running on the target terminals. The respective applications are configured to control the media information displayed on
(Continued)

the target terminals in accordance with the operation instruction.

15 Claims, 7 Drawing Sheets

Related U.S. Application Data continuation of application No. PCT/CN2014/079762, filed on Jun. 12, 2014.

(51) Int. Cl.
*G06F 3/0484* (2013.01)
*H04W 4/50* (2018.01)
*H04W 4/60* (2018.01)
*H04L 29/06* (2006.01)

(52) U.S. Cl.
CPC ............... *H04L 67/10* (2013.01); *H04W 4/50* (2018.02); *H04W 4/60* (2018.02); *H04L 65/403* (2013.01)

(56) References Cited

U.S. PATENT DOCUMENTS

| | | | |
|---|---|---|---|
| 2006/0208871 A1* | 9/2006 | Hansen | G06F 3/1454 340/506 |
| 2008/0184127 A1 | 7/2008 | Rafey et al. | |
| 2011/0078532 A1 | 3/2011 | Vonog et al. | |
| 2011/0081923 A1 | 4/2011 | Forutanpour et al. | |
| 2012/0266091 A1 | 10/2012 | Kim et al. | |
| 2012/0297423 A1* | 11/2012 | Kanojia | H04N 21/6581 725/48 |
| 2013/0017780 A1* | 1/2013 | Rose | H04W 12/0804 455/41.1 |
| 2013/0018960 A1* | 1/2013 | Knysz | H04L 65/403 709/204 |
| 2013/0091212 A1 | 4/2013 | Rajakarunanayake | |
| 2013/0091214 A1* | 4/2013 | Kellerman | G06Q 10/00 709/204 |
| 2013/0332513 A1* | 12/2013 | Honda | H04L 67/42 709/203 |
| 2013/0339536 A1 | 12/2013 | Burckart et al. | |
| 2014/0250472 A1 | 9/2014 | Huang et al. | |
| 2014/0327677 A1* | 11/2014 | Walker | G06T 11/206 345/440 |

FOREIGN PATENT DOCUMENTS

| | | |
|---|---|---|
| CN | 102064985 A | 5/2011 |
| CN | 102790768 A | 11/2012 |
| CN | 102821015 A | 12/2012 |
| CN | 103368947 A | 10/2013 |
| WO | WO 2006133345 A2 | 12/2006 |

OTHER PUBLICATIONS

Tencent Technology, Written Opinion, PCT/CN2014/079762, dated Sep. 26, 2014, 5 pgs.

Tencent Technology, IPRP, PCT/CN2014/079762, Dec. 22, 2015, 6 pgs.

Brian Burgess, "Use AirPlay to Stream Movies and Music Wirelessly Among Apple TV, Computers and iDevices", gPost, Dec. 30, 2011, retrieved from: https ://www.groovypost.com/howto/setup-airplay-stream-moviews-music-wirelessly-appletv-ipad-computers/.

* cited by examiner

METHOD AND SYSTEM FOR CONTROLLING MEDIA INFORMATION DISPLAY ON MULTIPLE TERMINALS

CROSS-REFERENCE TO RELATED APPLICATIONS

This application is a continuation application of U.S. patent application Ser. No. 14/818,705, entitled "METHOD AND SYSTEM FOR CONTROLLING MEDIA INFORMATION DISPLAY ON MULTIPLE TERMINALS" filed on Aug. 5, 2015, which is a continuation application of PCT Patent Application No. PCT/CN2014/079762, entitled "METHOD AND SYSTEM FOR CONTROLLING MEDIA INFORMATION DISPLAY ON MULTIPLE TERMINALS" filed on Jun. 12, 2014, which claims priority to Chinese Patent Application No. 201310250081.6, "MEDIA INFORMATION CONTROL METHOD AND RELATED DEVICE AND SYSTEM," filed on Jun. 21, 2013, all of which are hereby incorporated by reference in their entirety.

TECHNICAL FIELD

The disclosed implementations relate generally to the field of Internet, and in particular, to a media information control method, a related device and a system.

BACKGROUND

Along with the increase of numbers of terminals (such as mobile phones, smart televisions and tablet computers) joining a local area network, more and more advertisers push media information to the terminals through the local area network to achieve the objective of pushing media information to a broader range. However, practice shows that, pushing media information to terminals through a local area network in the prior art is a really blind information pushing manner, which easily annoys the user and cannot implement precise pushing of media information. Moreover, media information displayed on the terminal can be hidden only after waiting for a period of time (such as 45 seconds) or after being closed by the user manually, and the media information cannot be hidden efficiently in time.

SUMMARY

The above deficiencies and other problems (e.g., security issues) associated with the conventional approach of controlling media information are reduced or eliminated by the present application disclosed below. In some embodiments, the present application is implemented in a computer server that has one or more processors, memory and one or more modules, programs or sets of instructions stored in the memory for performing multiple functions and communicating with one or more client devices within a local area network (e.g., a PC, a tablet or a smartphone) that has one or more processors, memory and one or more modules, programs or sets of instructions stored in the memory for performing multiple functions. Instructions for performing these functions may be included in a computer program product configured for execution by one or more processors.

One aspect of the present application involves a method of controlling the operation of a target terminal performed at an operating terminal, the operating terminal having a display, one or more processors and memory storing programs to be executed by the one or more processors. The method includes: displaying, on the target terminal and using a client-side application, information transmitted from the application server to the target terminal; detecting, by the operating terminal, a predefined physical movement of the operating terminal by a user of the operating terminal and a user-selected operation; in response to detecting the predefined physical movement of the operating terminal by the user, sending, by the operating terminal, an operation instruction to the application server, the operation instruction including a device identifier of the target terminal and an operation identifier of the user-selected operation; in response to the operation instruction, transmitting, by the application server, simultaneously an identical copy of the information displayed on the target terminal to the operating terminal; and outputting, on the display of the operating terminal, the information transmitted from the application server synchronously using the client-side application running at the operating terminal.

Another aspect of the present application involves an operating terminal having a display, one or more processors and memory storing a plurality of operations executed by the one or more processors. The operating terminal is communicatively connected to a target terminal within a local area network and both the operating terminal and the target terminal are logged in by a user account of a social networking platform hosted by an application server, and the plurality of operations, when executed by the one or more processors, cause the operating terminal to perform the aforementioned method of controlling the operation of the target terminal.

Another aspect of the present application involves a non-transitory computer readable storage medium storing a plurality of operations in connection with an operating terminal that is communicatively connected to a target terminal within a local area network and both the operating terminal and the target terminal are logged in by a user account of a social networking platform hosted by an application server, and the plurality of operations, when executed by the one or more processors, cause the operating terminal to perform the aforementioned method of controlling the operation of the target terminal.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

Like reference numerals refer to corresponding parts throughout the several views of the drawings.

DESCRIPTION OF EMBODIMENTS

Figure 1:
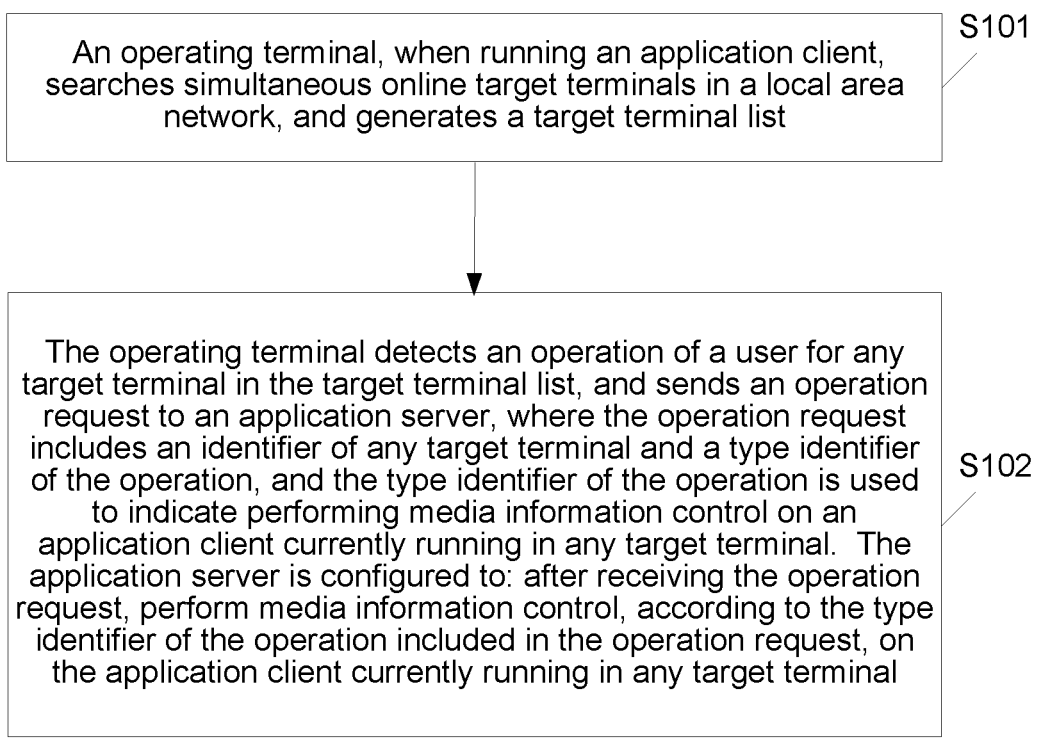
FIG. 1 is a flowchart of a media information control method according to an embodiment of the present application.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are a part rather than all of the embodiments of the present application. All other embodiments obtained by persons of ordinary skill in the art based on the embodiments of the present application without creative efforts shall fall within the protection scope of the present application.

The embodiments of the present application disclose a media information control method and a device and a system, which can implement precise control of media information, and can also control the media information efficiently in time. The method, device and system are described in detail separately in the following.

An embodiment of the present application discloses a media information control method, and the method may include the following steps:

Step 1. An operating terminal detects an operation of a user for any target terminal in a pre-stored target terminal list, and sends an operation request to an application server, where the operation request includes an identifier of any target terminal and a type identifier of the operation, and the type identifier of the operation is used to indicate performing media information control on an application client currently running in any target terminal.

In the embodiment of the present application, the pre-stored target terminal list may be a target terminal list matched in advance with the operating terminal, and may also be a target terminal list generated by the operating terminal, when running the application client, searching simultaneous online target terminals in a local area network, which is not limited in the embodiment of the present application.

Step 2. After receiving the operation request, the application server performs media information control, according to the type identifier of the operation included in the operation request, on the application client currently running in any target terminal.

In the embodiment of the present application, the application server may also store the target terminal list matched in advance with the operating terminal.

By implementing the embodiment of the present application, not only precise control of media information can be achieved, but also media information can be controlled efficiently in time.

Referring to FIG. 1, FIG. 1 is a flowchart of a media information control method according to an embodiment of the present application. As shown in FIG. 1, the media information control method may include the following steps.

S101. An operating terminal, when running an application client, searches simultaneous online target terminals in a local area network, and generates a target terminal list.

In the embodiment of the present application, the operating terminal includes a terminal such as a smart phone (such as an Android mobile phone and an iOS mobile phone), a tablet computer, a palmtop computer, a mobile Internet device (MID), and a personal computer (PC).

In the embodiment of the present application, the target terminal includes a terminal such as a smart television, a smart phone (such as an Android mobile phone and an iOS mobile phone), a tablet computer, a palmtop computer, an MID, a PAD, and a PC.

In the embodiment of the present application, the application client refers to an application program, and may include a connection application program, such as email, instant messaging, GPS navigation, and remote access; may also include a commercial application program, such as a mobile bank service, stock market tracking and trading, file processing, and schedule planning; may also include a life-style application program, such as e-commerce, bill payment, health monitoring, digital reading, and social communication; and may also include entertainment application program, such as news, games, a multimedia player, photos, and a video editor, which is not limited in the embodiment of the present application. In some embodiments, the application client is a client-side of a social networking platform running on a terminal device (e.g., a smartphone).

In the embodiment of the present application, before the operating terminal, when running an application client, searches simultaneous online target terminals in a local area network, and generates a target terminal list, the operating terminal may further execute the following operation:

The operating terminal, when running an application client, detects a search start instruction input by a user, and in response to the search start instruction, performs the step of searching, when running an application client, simultaneous online target terminals in a local area network, and generating a target terminal list. In other words, in the embodiment of the present application, the operating terminal may search the simultaneous online target terminals in a local area network under manual triggering, and generates the target terminal list.

S102. The operating terminal detects an operation of the user for any target terminal in the target terminal list, and sends an operation request to an application server, where the operation request includes an identifier of any target terminal and a type identifier of the operation, and the type identifier of the operation is used to indicate performing media information control on an application client currently running in any target terminal. The application server is configured to: after receiving the operation request, perform media information control, according to the type identifier of the operation included in the operation request, on the application client currently running in any target terminal.

In the embodiment of the present application, the media information control may include hiding media information output by the application client currently running in any target terminal, or include transmitting media information output by the application client currently running in any target terminal to the application client running in the operating terminal for output, or include transmitting media information output by the application client running in the operating terminal to the application client currently running in any target terminal for output.

In the embodiment of the present application, the operating terminal detecting an operation of the user for any target terminal in the target terminal list may include: the operating terminal detects a swing operation of the user for any target terminal in the target terminal list. For example, the user may select any target terminal from the target terminal list, and swings (for example, shakes) the operating terminal, so that the operating terminal may detect the swing operation of the user for any target terminal in the target terminal list.

In the embodiment of the present application, the operating terminal may be directly connected to the application server, and therefore, the operating terminal may directly send the operation request to the application server.

In the embodiment of the present application, the operating terminal may also be connected to the application server through a relay server, and therefore, the operating terminal may send the operation request to the relay server, and the relay server sends the operation request to the application server.

In some embodiments, the application server is the server-side of a social networking platform that communicates with the client-side of the social networking platform running on a terminal. The client-side of the social networking platform may be a dedicated application or supported by a web browser application.

In the embodiment of the present application, if the media information control indicated by the type identifier of the operation includes hiding media information output by the application client currently running in any target terminal, the application server, after receiving the operation request, performing media information control, according to the type identifier of the operation included in the operation request, on the application client currently running in any target terminal includes:

after receiving the operation request, the application server hides, according to indication of the type identifier of the operation included in the operation request, the media information output by the application client currently running in any target terminal. In this way, the user does not need to wait for a certain period of time (such as 45 seconds) or manually close the media information to implement hiding of the media information, so that media information can be hidden efficiently in time.

In the embodiment of the present application, the application server may hide media information which has a size greater than or equal to a preset size and is output by the application client currently running in any target terminal, or, the application server may hide all media information output by the application client currently running in any target terminal.

For example, a local area network of a user A has several devices online simultaneously, and the user A views a video by using a video player (that is, an application client) of a smart television, and there is advertisement media information shown at a black edge area of the video. Therefore, the user A may search, by using a mobile terminal (that is, an operating terminal) and generate a target terminal list including the smart television, and further, the user A may select the smart television (that is, a target terminal) from the target terminal list, and swings (for example, shakes) the smart phone, so that the smart phone may detect the swing operation of the user for the smart television in the target terminal list, and send an operation request to an application server. The operation request includes an identifier of the smart television and a type identifier of the operation, and the type identifier of the operation is used to indicate controlling the advertisement media information output by the video player (that is, the application client) currently running in the smart television, and the control includes hiding. After receiving the operation request sent by the smart phone, the application server may hide, according to the type identifier of the operation included in the operation request, the advertisement media information output by the video player (that is, the application client) currently running in the smart television. The application server may hide media information that has a size greater than or equal to a preset size and is output by the video player (that is, the application client) currently running in the smart television, or the application server may also hide all media information output by the video player (that is, the application client) currently running in the smart television.

Figure 6:
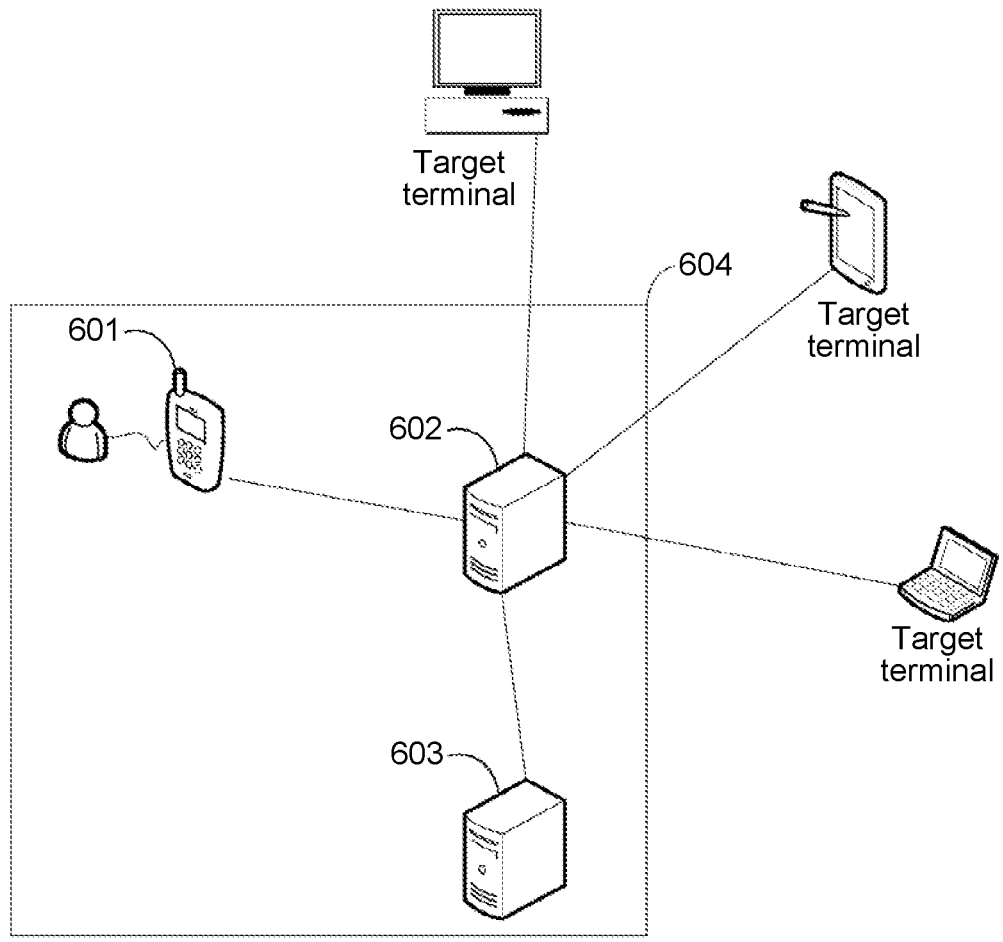
FIG. 6 is a structural diagram of a media information control system according to an embodiment of the present application.

In some embodiments, the present application is directed to a scenario in which the user of the operating terminal (e.g., a parent) wants to control the media information (e.g., a game) displayed on the target terminals by other users (e.g., children) within the same household. In this case, both the operating terminal and the target terminals are within the same local area network. But both parties are connected to a remote server as shown in FIG. 6. The remote server is responsible for managing the status of the terminals within the household. In order to prevent inappropriate media information from being displayed on the target terminals, the user of the operating terminal may need to access the media information displayed on the target terminal. In some embodiments, the media information displayed on the target terminal is locally stored on the target terminals. In some other embodiments, the media information may come from a remote media server as described in FIG. 6 below. Based on the nature of the media information, the user of the operating terminal may send an operation instruction to the remote server for terminating the media display on the target terminals. In some embodiments, the remote server sends commands to the target terminals for terminating the application clients that are currently displaying inappropriate content. In some other embodiments, the remote server may simply stop feeding the media information to the target terminals. In yet some other embodiments, the user of the operating terminal may send an operation instruction to the remote server for sharing some media information with the target terminals. For example, the user of the operating terminal may find a piece of useful media information and wants to share it with the users at the target terminals. In either case, the remote server is responsible for implementing the operating terminal's control over the target terminals. In some embodiments, the remote server manages a list of online terminals within a particular local area network and returns them to the operating terminal for display. In this case, each online target terminal has a device identifier and a set of operations to be applied to the target terminal. Exemplary operations include turning on the application, turning off the application, and suspending the application, etc.

In some embodiments, both the device identifiers and the set of operations are displayed on the display of the operating terminal for the user to choose from. Based on the user-selected target terminals and the corresponding user-selected operations, the operating terminal submits an operation instruction to the remote server. Upon receipt of the operation instruction, the remote server interprets the operation instruction and takes an appropriate course of actions accordingly. For example, if the operation instruction is to terminate a respective application running on the corresponding target terminal, the remote server records a current status of the application running on the corresponding target terminal and terminates the application running on the corresponding target terminal. To do so, the remote server may send a termination command to the target terminal. Sometimes, the application may be related to a paid service provided by another server (e.g., the media server 603 in FIG. 6). Additional to terminating the application at the target terminal, the remote server also sends a termination notification to the media server that supports the application running on the corresponding target terminal.

In some embodiments, the operation instruction is to share media information currently displayed on a respective target terminal with the operating terminal. For example, the user of the operating terminal wants to know what content is currently displayed by an application running on the target terminal. The remote server then synchronizes the display of the media information between the respective target terminal and the operating terminal. For example, the remote server may replicate the media content currently displayed on the target terminal and send it to the operating terminal. Note that such transaction may or may not be visible to the user of the target terminal as long as the user of the operating terminal is legally authorized for doing so, which is usually the case within a household. In some other embodiments, the operation instruction is to share media information currently displayed on the operating terminal with a respective target terminal. For example, the user of the operating terminal finds something interesting and may want to share it with others within the same household. In this case, the remote server also synchronizes the display of the media information between the operating terminal and the respective target terminal. For example, the remote server may replicate the media content and forward it to the target terminals. In other words, the media sharing is in both directions but the control always falls within the hand of the user of the operating terminal.

In the embodiment of the present application, the method shown in FIG. 1 may further include that:

the application server generates a hiding feedback record of the media information, where the hiding feedback record includes an identifier of the operating terminal; and the application server sends the hiding feedback record to a media information providing server. Further, the hiding feedback record may further include an identifier of the hidden media information. In this way, loss brought about to a media information provider by shortening of exposure time of the media information may be compensated, so that the media information provider may acquire that the media information thereof has been viewed by the user.

In the embodiment of the present application, if the media information control indicated by the type identifier of the operation includes transmitting the media information output by the application client currently running in any target terminal to the application client running in the operating terminal, the application server, after receiving the operation request, performing media information control, according to the type identifier of the operation included in the operation request, on the application client currently running in any target terminal includes:

after receiving the operation request, the application server transmits, according to the indication of the type identifier of the operation included in the operation request, the media information output by the application client currently running in any target terminal to the application client running in the operating terminal for output.

In the embodiment of the present application, the application server may transmit media information, which has a size greater than or equal to a preset size and is output by the application client currently running in any target terminal, to the application client running in the operating terminal for output, or, the application server may transmit all media information output by the application client currently running in any target terminal to the application client running in the operating terminal for output.

In the embodiment of the present application, after the application server transmits the media information output by the application client currently running in any target terminal to the application client running in the operating terminal for output, the application server may record mapping relationship between an identifier of the media information output by the application client running in the operating terminal and an identifier of the operating terminal, and further, the application server may send the mapping relationship to the media information provider, so that the media information provider may acquire that the media information thereof has been viewed by the user of the operating terminal.

In the embodiment of the present application, when the application server transmits the media information output by the application client currently running in any target terminal to the application client running in the operating terminal for output, the application server may simultaneously and synchronously transmit application content output by the application client currently running in any target terminal to the application client running in the operating terminal for output; or, after the application server transmits the media information output by the application client currently running in any target terminal to the application client running in the operating terminal for output, the application server may synchronously transmit, when timing stops, the application content output by the application client currently running in any target terminal to the application client running in the operating terminal for output. The application client currently running in any target terminal and the application client running in the operating terminal have the same type.

In the embodiment of the present application, the application content output by the application client currently running in any target terminal includes a video, a file, a picture, music and the like, which is not limited in the embodiment of the present application.

In the embodiment of the present application, the application server may completely synchronize the application content output by the application client currently running in any target terminal to the operating terminal, or, the application server may synchronize the application content started from the current moment and output by the application client currently running in any target terminal to the operating terminal, which is not limited in the embodiment of the present application.

In the embodiment of the present application, if the media information control indicated by the type identifier of the operation includes transmitting the media information output by the application client running in the operating terminal to the application client currently running in any target terminal for output, the application server, after receiving the operation request, performing media information control, according to the type identifier of the operation included in the operation request, on the application client currently running in any target terminal includes:

after receiving the operation request, the application server transmits, according to the indication of the type identifier of the operation included in the operation request, the media information output by the application client running in the operating terminal to the application client currently running in any target terminal for output.

In the embodiment of the present application, the application server may transmit media information, which has a size greater than or equal to a preset size and is output by the application client running in the operating terminal, to the application client currently running in any target terminal for output, or, the application server may transmit all media information output by the application client running in the operating terminal to the application client currently running in any target terminal for output.

In the embodiment of the present application, after the application server receives the operation request, if it is found that any target terminal currently does not run any application client, after the application server detects that any target terminal runs an application client, the application server may transmit, according to the indication of the type identifier of the operation included in the operation request, the media information output by the application client running in the operating terminal to the application client currently running in any target terminal for output.

In the embodiment of the present application, after the application server transmits the media information output by the application client running in the operating terminal to the application client currently running in any target terminal for output, the application server may record mapping relationship between an identifier of the media information output by the application client currently running in any target terminal and an identifier of any target terminal, and further, the application server may send the mapping relationship to the media information provider, so that the media information provider may acquire that the media information thereof has been viewed by the user of any target terminal.

In the embodiment of the present application, when the application server transmits the media information output by the application client running in the operating terminal to the application client currently running in any target terminal for output, the application server may simultaneously and synchronously transmit application content output by the application client running in the operating terminal to the application client currently running in any target terminal for output; or, after the application server transmits the media information output by the application client running in the operating terminal to the application client currently running in any target terminal for output, the application server may synchronously transmit, when timing stops, the application content output by the application client running in the operating terminal to the application client currently running in any target terminal for output. The application client currently running in any target terminal and the application client running in the operating terminal have the same type.

In the embodiment of the present application, the application content output by the application client running in the operating terminal includes a video, a file, a picture, music and the like, which is not limited in the embodiment of the present application.

In the embodiment of the present application, the application server may completely synchronize the application content output by the application client running in the operating terminal to any target terminal, or, the application server may synchronize the application content started from the current moment and output by the application client running in the operating terminal to any target terminal, which is not limited in the embodiment of the present application.

In the method shown in FIG. 1, an operating terminal, when running an application client, may search simultaneous online target terminals in a local area network (such as a local area network) and generate a target terminal list, so that the operating terminal may detect an operation of a user for any target terminal in the target terminal list and send an operation request to an application server, where the operation request includes an identifier of any target terminal and a type identifier of the operation, and the type identifier of the operation is used to indicate hiding media information output by an application client currently running in any target terminal or transmitting the media information output by an application client currently running in any target terminal to the application client running in the operating terminal for output, or transmitting media information output by the application client running in the operating terminal to an application client currently running in any target terminal for output; after receiving the operation request, the application server may perform media information control, according to the type identifier of the operation included in the operation request, on the application client currently running in any target terminal. It can be seen that, by implementing the method shown in FIG. 1, not only precise pushing of media information can be achieved, but also the media information can be hidden efficiently in time.

Figure 2:
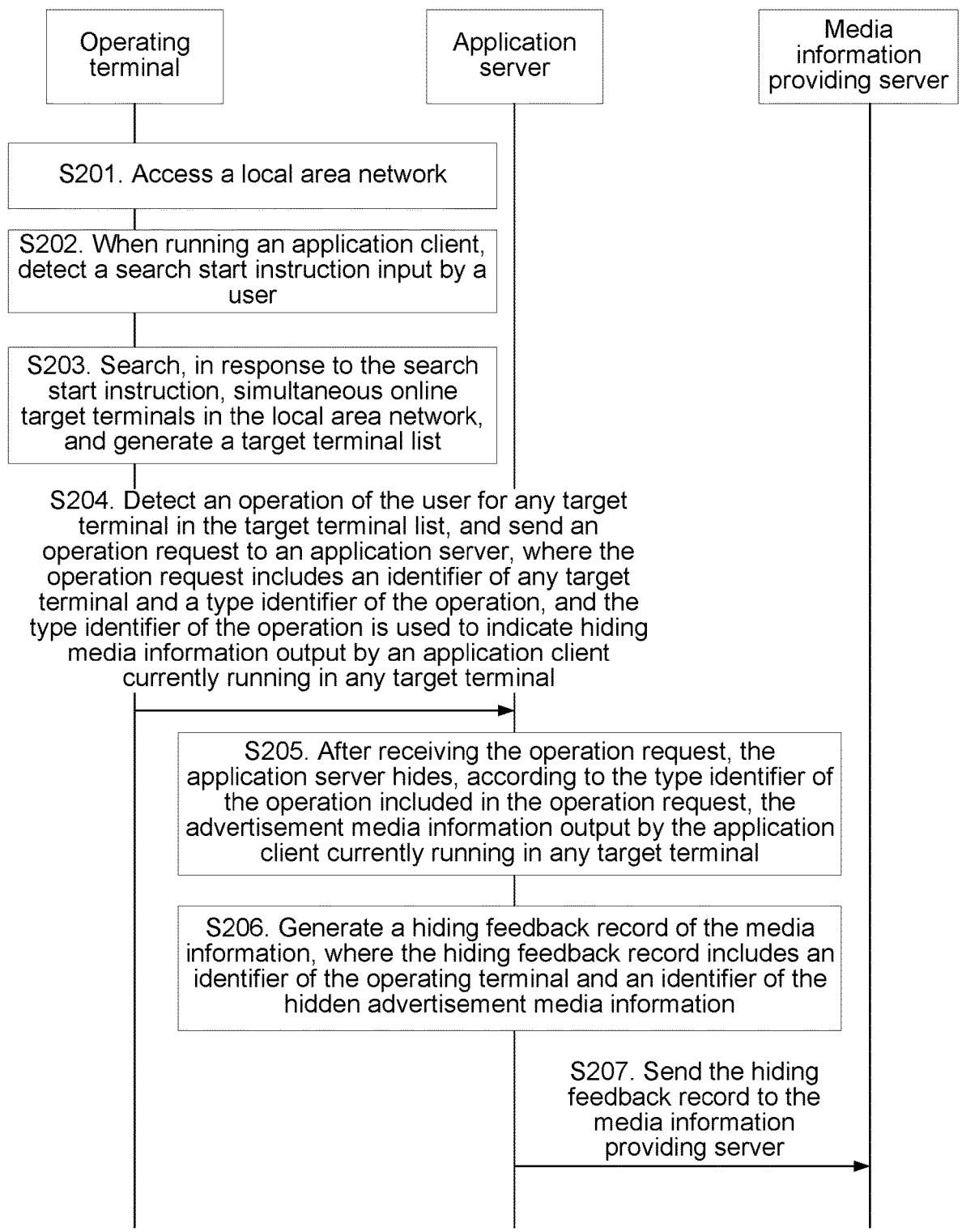
FIG. 2 is a flowchart of another media information control method according to an embodiment of the present application.

Referring to FIG. 2, FIG. 2 is a flowchart of another media information control method according to an embodiment of the present application. As shown in FIG. 2, the media information control method may include the following steps.

S201. An operating terminal accesses a local area network.

In the embodiment of the present application, the operating terminal may access the local area network through a home router.

S202. The operating terminal, when running an application client, detects a search start instruction input by a user.

In the embodiment of the present application, the operating terminal includes a terminal such as a smart phone (such as an Android mobile phone and an iOS mobile phone), a tablet computer, a palmtop computer, an MID, and a PC.

In the embodiment of the present application, the application client refers to an application program, and may include a connection application program, such as email, instant messaging, GPS navigation, and remote access; may also include a commercial application program, such as a mobile bank service, stock market tracking and trading, file processing, and schedule planning; may also include a life-style application program, such as e-commerce, bill payment, health monitoring, digital reading, and social communication; and may also include entertainment application program, such as news, games, a multimedia player, photos, and a video editor, which is not limited in the embodiment of the present application.

S203. The operating terminal searches, in response to the search start instruction, simultaneous online target terminals in the local area network, and generates a target terminal list.

In the embodiment of the present application, the target terminal includes a terminal such as a smart television, a smart phone (such as an Android mobile phone and an iOS mobile phone), a tablet computer, a palmtop computer, an MID, a PAD, and a PC.

S204. The operating terminal detects an operation of the user for any target terminal in the target terminal list, and sends an operation request to an application server, where the operation request includes an identifier of any target terminal and a type identifier of the operation, and the type identifier of the operation is used to indicate hiding advertisement media information output by an application client currently running in any target terminal.

In the embodiment of the present application, the operating terminal detecting an operation of the user for any target terminal in the target terminal list may include: the operating terminal detects a swing operation of the user for any target terminal in the target terminal list. For example, the user may select any target terminal from the target terminal list, and swings (for example, shakes) the operating terminal, so that the operating terminal may detect the swing operation of the user for any target terminal in the target terminal list.

In the embodiment of the present application, the operating terminal may be directly connected to the application server, and therefore, the operating terminal may directly send the operation request to the application server.

In the embodiment of the present application, the operating terminal may also be connected to the application server through a relay server, and therefore, the operating terminal may send the operation request to the relay server, and the relay server sends the operation request to the application server.

S205. After receiving the operation request, the application server hides, according to the type identifier of the operation included in the operation request, the advertisement media information output by the application client currently running in any target terminal.

In the embodiment of the present application, the user does not need to wait for a certain period of time (such as 45 seconds) or manually close the advertisement media information to implement hiding of the advertisement media information, so that the advertisement media information can be hidden efficiently in time.

For example, a local area network of a user A has several devices online simultaneously, the user A views a video by using a video player (that is, an application client) of a PC, and there is advertisement media information shown at a black edge area of the video. Therefore, the user A may search, by using a mobile terminal (that is, an operating terminal) and generate a target terminal list including the PC, and further, the user A may select the PC (that is, a target terminal) from the target terminal list, and swings (for example, shakes) the smart phone, so that the smart phone may detect the swing operation of the user for the PC in the target terminal list, and sends an operation request to an application server. The operation request includes an identifier of the PC and a type identifier of the operation, and the type identifier of the operation is used to indicate hiding the advertisement media information output by the video player (that is, the application client) currently running in the PC. After receiving the operation request sent by the smart phone, the application server may hide, according to the type identifier of the operation included in the operation request, the advertisement media information output by the video player (that is, the application client) currently running in the PC.

After receiving the operation request sent by the smart phone, the application server may hide, according to the type identifier of the operation included in the operation request, the advertisement media information that has a size greater than or equal to a preset threshold and is output by the video player (that is, the application client) currently running in the PC, or hide all advertisement media information output by the video player (that is, the application client) currently running in the PC.

S206. The application server generates a hiding feedback record of the advertisement media information, where the hiding feedback record includes an identifier of the operating terminal and an identifier of the hidden advertisement media information.

S207. The application server sends the hiding feedback record to a media information providing server.

By means of steps S206 to S207, loss brought about to a media information provider by shortening of exposure time of the advertisement media information may be compensated, so that the media information provider may acquire that the advertisement media information thereof has been viewed by the user.

In the method shown in FIG. 2, an operating terminal, when running an application client, may detect a search start instruction input by a user, search simultaneous online target terminals in a local area network in response to the search start instruction, and generate a target terminal list, so that the operating terminal may detect an operation of the user for any target terminal in the target terminal list and send an operation request to an application server, where the operation request includes an identifier of any target terminal and a type identifier of the operation, and the type identifier of the operation is used to indicate hiding advertisement media information output by an application client currently running in any target terminal. After receiving the operation request, the application server may hide, according to the type identifier of the operation included in the operation request, the advertisement media information output by the application client currently running in any target terminal. It can be seen that, by implementing the method shown in FIG. 1, the advertisement media information can be hidden efficiently in time.

Figure 3:
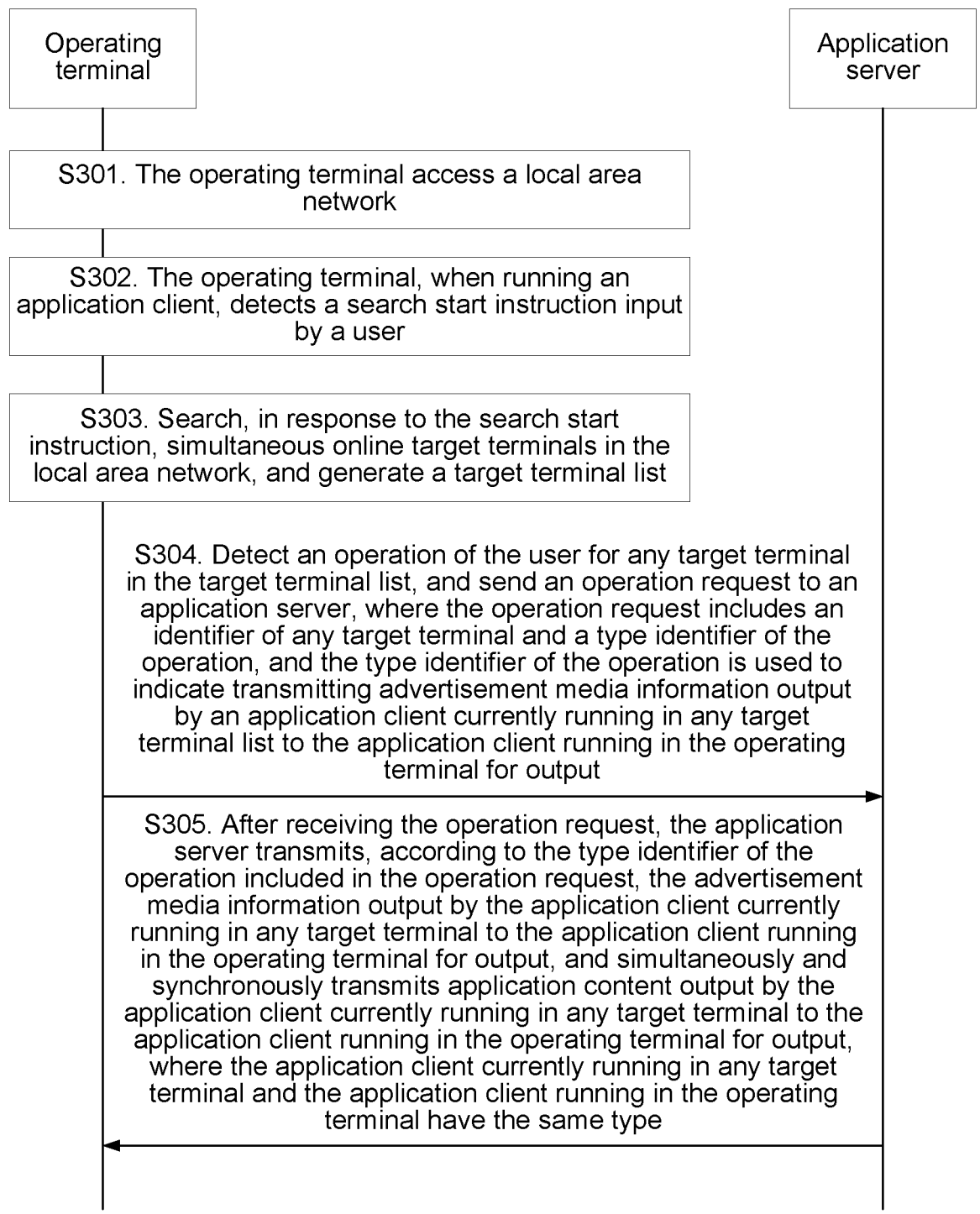
FIG. 3 is a flowchart of another media information control method according to an embodiment of the present application.

Referring to FIG. 3, FIG. 3 is a flowchart of another media information control method according to an embodiment of the present application. As shown in FIG. 3, the media information control method may include the following steps.

S301. An operating terminal access a local area network.

In the embodiment of the present application, the operating terminal may access the local area network through a home router.

S302. The operating terminal, when running an application client, detects a search start instruction input by a user.

In the embodiment of the present application, the operating terminal includes a terminal such as a smart phone (such as an Android mobile phone and an iOS mobile phone), a tablet computer, a palmtop computer, an MID, and a PC.

In the embodiment of the present application, the application client refers to an application program, and may include a connection application program, such as email, instant messaging, GPS navigation, and remote access; may also include a commercial application program, such as a mobile bank service, stock market tracking and trading, file processing, and schedule planning; may also include a life-style application program, such as e-commerce, bill payment, health monitoring, digital reading, and social communication; and may also include entertainment application program, such as news, games, a multimedia player, photos, and a video editor, which is not limited in the embodiment of the present application.

S303. The operating terminal searches, in response to the search start instruction, simultaneous online target terminals in the local area network, and generates a target terminal list.

In the embodiment of the present application, the target terminal includes a terminal such as a smart television, a smart phone (such as an Android mobile phone and an iOS mobile phone), a tablet computer, a palmtop computer, an MID, a PAD, and a PC.

S304. The operating terminal detects an operation of the user for any target terminal in the target terminal list, and sends an operation request to an application server, where the operation request includes an identifier of any target terminal and a type identifier of the operation, and the type identifier of the operation is used to indicate transmitting advertisement media information output by an application client currently running in any target terminal list to the application client running in the operating terminal for output.

In the embodiment of the present application, the operating terminal detecting an operation of the user for any target terminal in the target terminal list may include: the operating terminal detects a swing operation of the user for any target terminal in the target terminal list. For example, the user may select any target terminal from the target terminal list, and swings (for example, shakes) the operating terminal, so that the operating terminal may detect the swing operation of the user for any target terminal in the target terminal list.

In the embodiment of the present application, the operating terminal may be directly connected to the application server, and therefore, the operating terminal may directly send the operation request to the application server.

In the embodiment of the present application, the operating terminal may also be connected to the application server through a relay server, and therefore, the operating terminal may send the operation request to the relay server, and the relay server sends the operation request to the application server.

S305. After receiving the operation request, the application server transmits, according to the type identifier of the operation included in the operation request, the advertisement media information output by the application client currently running in any target terminal to the application client running in the operating terminal for output, and simultaneously and synchronously transmits application content output by the application client currently running in any target terminal to the application client running in the operating terminal for output, where the application client currently running in any target terminal and the application client running in the operating terminal have the same type.

For example, a local area network of a user A has several devices online simultaneously, and the user A views a video by using a video player (that is, an application client) of a smart television, and there is advertisement media information shown at a black edge area of the video. Therefore, the user A may search, by using a mobile terminal (that is, an operating terminal) and generate a target terminal list including the smart television, and further, the user A may select the smart television (that is, a target terminal) from the target terminal list, and swings (for example, shakes) the smart phone, so that the smart phone may detect the swing operation of the user for the smart television in the target terminal list, and sends an operation request to an application server. The operation request includes an identifier of the smart television and a type identifier of the operation, and the type identifier of the operation is used to indicate transmitting the advertisement media information output by the video player (that is, the application client) currently running in the smart television to a video player (that is, an application client) running in the mobile phone for output. After receiving the operation request sent by the smart phone, the application server may transmit, according to the type identifier of the operation included in the operation request, the advertisement media information output by the video player (that is, the application client) currently running in the smart television to the video player (that is, the application client) running in the mobile phone for output, and simultaneously and synchronously transmit the video (that is, application content) output by the video player (that is, the application client) currently running in the smart television to the video player (that is, the application client) running in the mobile phone for output; or, after the application server transmits the advertisement media information output by the video player (that is, the application client) currently running in the smart television to the video player (that is, the application client) running in the mobile phone for output, the application server may synchronously transmit, when timing stops, the video (that is, the application content) output by the video player (that is, the application client) currently running in the smart television to the video player (that is, the application client) running in the smart phone for output.

In the embodiment of the present application, the application server may completely synchronize the video (that is, the application content) output by the video player (that is, the application client) currently running in the smart television to the smart phone, or, the application server may synchronize the video (that is, the application content) started from the current moment and output by the video player (that is, the application client) currently running in the smart television to the smart phone, so that the user can view the same video by using different terminals discontinuously.

In the method shown in FIG. 3, an operating terminal, when running an application client, may detect a search start instruction input by a user, search simultaneous online target terminals in a local area network in response to the search start instruction, and generate a target terminal list, so that the operating terminal may detect an operation of the user for any target terminal in the target terminal list and send an operation request to an application server, where the operation request includes an identifier of any target terminal and a type identifier of the operation, and the type identifier of the operation is used to indicate transmitting advertisement media information output by an application client currently running in any target terminal to the application client running in the operating terminal. After receiving the operation request, the application server may transmit, according to the type identifier of the operation included in the operation request, the advertisement media information output by the application client currently running in any target terminal to the application client running in the operating terminal for output. It can be seen that, by implementing the method shown in FIG. 3, precise pushing of advertisement media information can be achieved.

Figure 4:
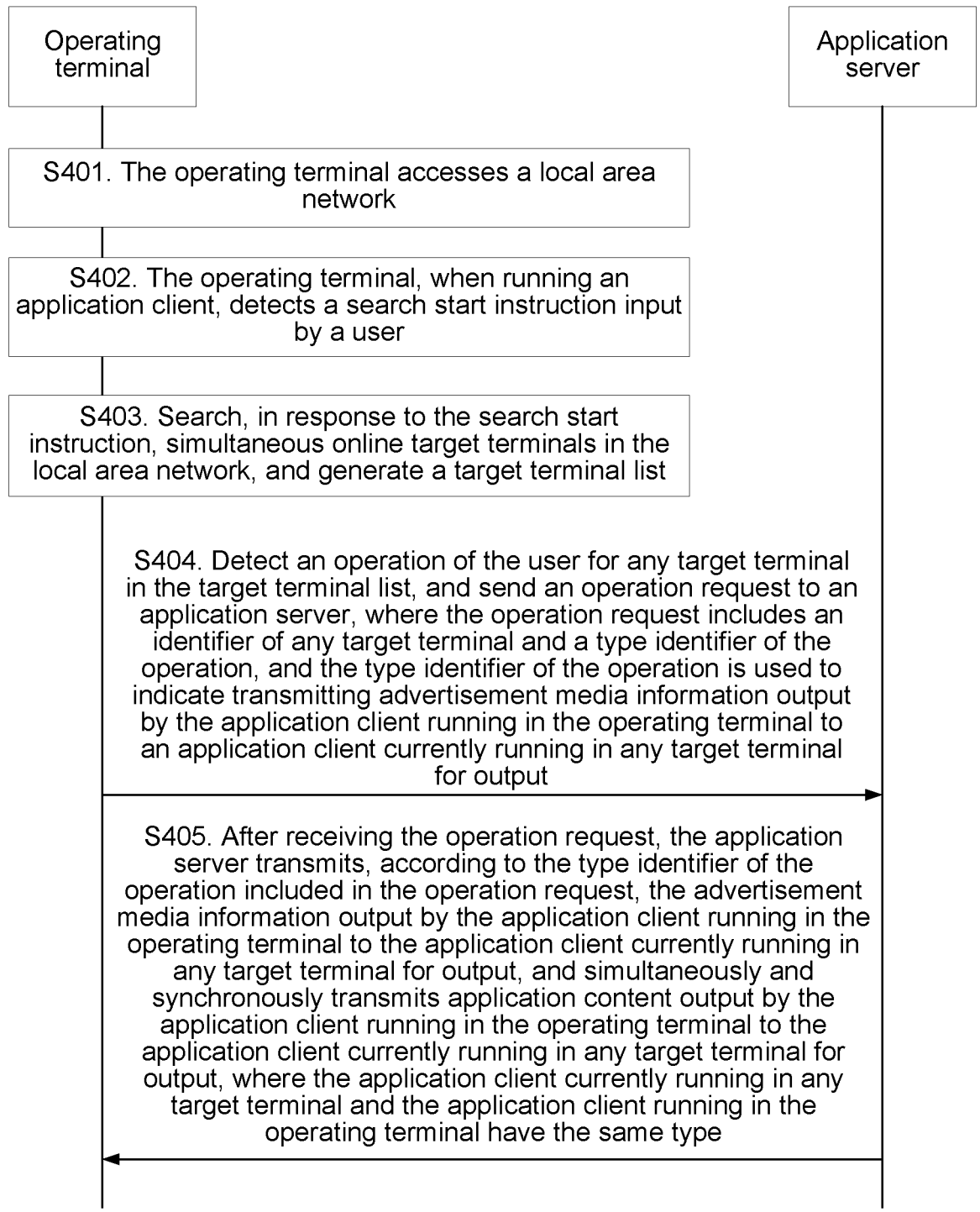
FIG. 4 is a flowchart of another media information control method according to an embodiment of the present application.

Referring to FIG. 4, FIG. 4 is a flowchart of another media information control method according to an embodiment of the present application. As shown in FIG. 4, the media information control method may include the following steps.

S401. An operating terminal accesses a local area network.

In the embodiment of the present application, the operating terminal may access the local area network through a home router.

S402. The operating terminal, when running an application client, detects a search start instruction input by a user.

In the embodiment of the present application, the operating terminal includes a terminal such as a smart phone (such as an Android mobile phone and an iOS mobile phone), a tablet computer, a palmtop computer, an MID, and a PC.

In the embodiment of the present application, the application client refers to an application program, and may include a connection application program, such as email, instant messaging, GPS navigation, and remote access; may also include a commercial application program, such as a mobile bank service, stock market tracking and trading, file processing, and schedule planning; may also include a life-style application program, such as e-commerce, bill payment, health monitoring, digital reading, and social communication; and may also include entertainment application program, such as news, games, a multimedia player, photos, and a video editor, which is not limited in the embodiment of the present application.

S403. The operating terminal searches, in response to the search start instruction, simultaneous online target terminals in the local area network, and generates a target terminal list.

In the embodiment of the present application, the target terminal includes a terminal such as a smart television, a smart phone (such as an Android mobile phone and an iOS mobile phone), a tablet computer, a palmtop computer, an MID, a PAD, and a PC.

S404. The operating terminal detects an operation of the user for any target terminal in the target terminal list, and sends an operation request to an application server, where the operation request includes an identifier of any target terminal and a type identifier of the operation, and the type identifier of the operation is used to indicate transmitting advertisement media information output by the application client running in the operating terminal to an application client currently running in any target terminal for output.

In the embodiment of the present application, the operating terminal detecting an operation of the user for any target terminal in the target terminal list may include: the operating terminal detects a swing operation of the user for any target terminal in the target terminal list. For example, the user may select any target terminal from the target terminal list, and swings (for example, shakes) the operating terminal, so that the operating terminal may detect the swing operation of the user for any target terminal in the target terminal list.

In the embodiment of the present application, the operating terminal may be directly connected to the application server, and therefore, the operating terminal may directly send the operation request to the application server.

In the embodiment of the present application, the operating terminal may also be connected to the application server through a relay server, and therefore, the operating terminal may send the operation request to the relay server, and the relay server sends the operation request to the application server.

S405. After receiving the operation request, the application server transmits, according to the type identifier of the operation included in the operation request, the advertisement media information output by the application client running in the operating terminal to the application client currently running in any target terminal for output, and simultaneously and synchronously transmits application content output by the application client running in the operating terminal to the application client currently running in any target terminal for output, where the application client currently running in any target terminal and the application client running in the operating terminal have the same type.

For example, a local area network of a user A has several devices online simultaneously, and the user A views a video by using a video player (that is, an application client) of a smart television, and there is advertisement media information shown at a black edge area of the video. Therefore, the user A may search, by using a mobile terminal (that is, an operating terminal) and generate a target terminal list including the smart television, and further, the user A may select the smart television (that is, a target terminal) from the target terminal list, and swings (for example, shakes) the smart phone, so that the smart phone may detect the swing operation of the user for the smart television in the target terminal list, and sends an operation request to an application server. The operation request includes an identifier of the smart television and a type identifier of the operation, and the type identifier of the operation is used to indicate transmitting the advertisement media information output by a video player (that is, an application client) running in the mobile phone to the video player (that is, the application client) currently running in the smart television for output. After receiving the operation request sent by the smart phone, the application server may transmit, according to the type identifier of the operation included in the operation request, the advertisement media information output by the video player (that is, the application client) running in the mobile phone to the video player (that is, the application client) currently running in the smart television for output, and simultaneously and synchronously transmit the video (that is, application content) output by the video player (that is, an application client) running in the mobile phone to the video player (that is, the application client) currently running in the smart television for output. Or, after the application server transmits the advertisement media information output by the video player (that is, the application client) running in the mobile phone to the video player (that is, the application client) currently running in the smart television for output, the application server may synchronously transmit, when timing stops, the video (that is, the application content) output by the video player (that is, the application client) running in the smart phone to the video player (that is, the application client) currently running in the smart television for output.

In the embodiment of the present application, the application server may completely synchronize the video (that is, the application content) output by the video player (that is, the application client) running in the smart phone to the smart television, or, the application server may synchronize the video (that is, the application content) started from the current moment and output by the video player (that is, the application client) currently running in the smart phone to the smart television, so that the user can view the same video by using different terminals discontinuously.

In the method shown in FIG. 4, an operating terminal, when running an application client, may detect a search start instruction input by a user, search simultaneous online target terminals in a local area network in response to the search start instruction, and generate a target terminal list, so that the operating terminal may detect an operation of the user for any target terminal in the target terminal list and send an operation request to an application server, where the operation request includes an identifier of any target terminal and a type identifier of the operation, and the type identifier of the operation is used to indicate transmitting advertisement media information output by the application client running in the operating terminal to an application client currently running in any target terminal. After receiving the operation request, the application server may transmit, according to the type identifier of the operation included in the operation request, the advertisement media information output by the application client running in the operating terminal to the application client currently running in any target terminal for output. It can be seen that, by implementing the method shown in FIG. 4, precise pushing of advertisement media information can be achieved.

In the embodiment of the present application, in a case where it is not required to search simultaneous online target terminals, for example, when the target terminal is powered off or the target terminal is not located in the same local area network with the operating terminal, for example, in a scenario such as metro, the application server may store a target terminal list pre-matched with the operating terminal, so that the operating terminal may send the operation request to the application server, and the application server performs media information control (for example, hiding or transmitting), according to the type identifier of the operation included in the operation request, on the application client running in the target terminal when the target terminal is powered on or a user preset condition (for example, timing stops) is met.

Figure 5:
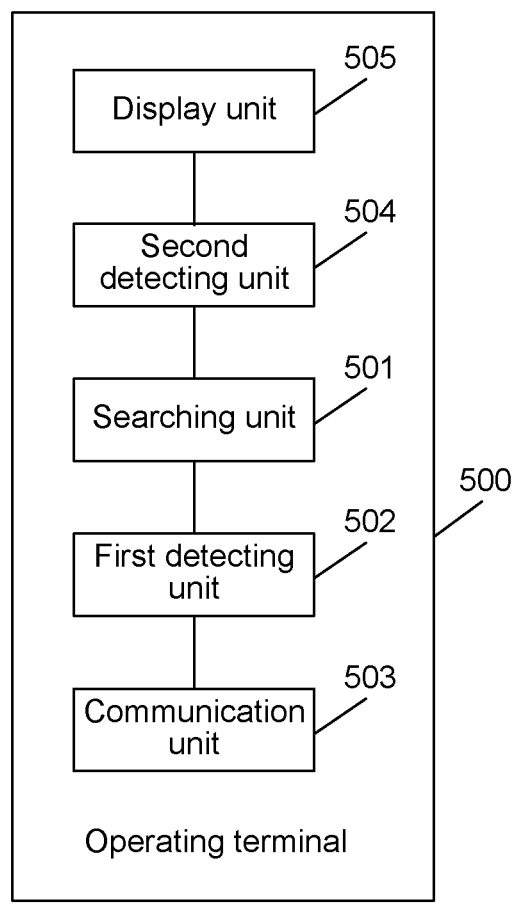
FIG. 5 is a structural diagram of an operating terminal according to an embodiment of the present application.

Referring to FIG. 5, FIG. 5 is a structural diagram of an operating terminal according to an embodiment of the present application. As shown in FIG. 5, the operating terminal 500 may include:

a searching unit 501, configured to: when the operating terminal runs an application client, search simultaneous online target terminals in a local area network, and generate a target terminal list;

a first detecting unit 502, configured to detect an operation of a user for any target terminal in the target terminal list; and a communication unit 503, configured to send an operation request to an application server, where the operation request includes an identifier of any target terminal and a type identifier of the operation, the type identifier of the operation is used to indicate performing media information control on an application client currently running in any target terminal, and the control includes hiding media information output by the application client currently running in any target terminal, or includes transmitting media information output by the application client currently running in any target terminal to the application client running in the operating terminal for output, or includes transmitting media information output by the application client running in the operating terminal to the application client currently running in any target terminal for output. The application server is configured to: after receiving the operation request, perform media information control, according to the type identifier of the operation included in the operation request, on the application client currently running in any target terminal.

In the embodiment of the present application, the operating terminal 500 may further include:

a second detecting unit 504, configured to: when the operating terminal runs an application client, detect a search start instruction input by a user, and trigger, in response to the search start instruction, the searching unit 501 to perform the step of searching, when the operating terminal runs an application client, simultaneous online target terminals in a local area network, and generate a target terminal list.

In the embodiment of the present application, the operating terminal 500 may further include:

a display unit 505, configured to: when the operating terminal runs an application client, display a target terminal list and display media information shared by other target terminals.

In the embodiment of the present application, the first detecting unit 502 is specifically configured to detect a swing operation of the user for any target terminal in the target terminal list.

In the embodiment of the present application, the communication unit 503 may be configured to send an operation request to a relay server, and the relay server sends the operation request to the application server.

By implementing the operating terminal shown in FIG. 5, not only precise pushing of media information can be achieved, but also media information can be hidden efficiently in time.

Referring to FIG. 6, FIG. 6 is a structural diagram of a media information control system according to an embodiment of the present application. As shown in FIG. 6, the media information control system 600 may include:

an operating terminal 601, configured to: when running an application client, search simultaneous online target terminals in a local area network, and generate a target terminal list; and detect an operation of a user for any target terminal in the target terminal list, and send an operation request to an application server 602, where the operation request includes an identifier of any target terminal and a type identifier of the operation, the type identifier of the operation is used to indicate performing media information control on an application client currently running in any target terminal, and the control includes hiding media information output by the application client currently running in any target terminal, or includes transmitting media information output by the application client currently running in any target terminal to an application client running in the operating terminal for output, or includes transmitting media information output by the application client running in the operating terminal to the application client currently running in any target terminal for output; and an application server 602, configured to: after receiving the operation request, perform media information control, according to the type identifier of the operation included in the operation request, on the application client currently running in any target terminal.

In the embodiment of the present application, before the operating terminal 601, when running an application client, searches simultaneous online target terminals in a local area network, and generates a target terminal list, the operating terminal 601 further performs the following operation:

the operating terminal 601 is configured to: when running an application client, detect a search start instruction input by a user, and perform, in response to the search start instruction, the step of searching, when running an application client, simultaneous online target terminals in a local area network, and generating a target terminal list.

In the embodiment of the present application, the operating terminal 601 detecting an operation of a user for any target terminal in the target terminal list includes:

the operating terminal 601 is configured to detect a swing operation of any target terminal in the target terminal list.

In the embodiment of the present application, the operating terminal 601 sending an operation request to an application server 602 includes:

the operating terminal 601 is configured to send an operation request to a relay server, and the relay server sends the operation request to the application server 602.

In the embodiment of the present application, if the control includes hiding media information of an application client currently running in any target terminal, the after receiving the operation request, the application server 602 performing media information control, according to the type identifier of the operation included in the operation request, on the application client currently running in any target terminal includes:

the application server 602 is configured to: after receiving the operation request, hide, according to indication of the type identifier of the operation included in the operation request, media information output by the application client currently running in any target terminal.

Correspondingly, in the embodiment of the present application, the system shown in FIG. 6 further includes an advertisement providing server 603, where:

the application server 603 is further configured to generate a hiding feedback record of media information, and send the hiding feedback record to the advertisement providing server, where the hiding feedback record includes an identifier of the operating terminal and an identifier of the media information.

In the embodiment of the present application, if the media information control includes transmitting media information output by an application client currently running in any target terminal to the application client running in the operating terminal for output, the after receiving the operation request, the application server 602 performing media information control, according to the type identifier of the operation included in the operation request, on the application client currently running in any target terminal includes:

the application server 602 is configured to: after receiving the operation request, transmit, according to indication of the type identifier of the operation included in the operation request, media information output by an application client currently running in any target terminal to the application client running in the operating terminal for output.

In the embodiment of the present application, the application server 602 is further configured to: when transmitting the media information output by the application client currently running in any target terminal to the application client running in the operating terminal 601 for output, simultaneously and synchronously transmit application content output by the application client currently running in any target terminal to the application client running in the operating terminal 601 for output, where the application client currently running in any target terminal and the application client running in the operating terminal 601 have the same type.

In the embodiment of the present application, if the media information control includes transmitting media information output by the application client running in the operating terminal 601 to an application client currently running in any target terminal for output, the after receiving the operation request, the application server 602 performing media information control, according to the type identifier of the operation included in the operation request, on the application client currently running in any target terminal includes:

the application server 602 is configured to: after receiving the operation request, transmit, according to indication of the type identifier of the operation included in the operation request, media information output by the application client running in the operating terminal 601 to an application client currently running in any target terminal for output.

In the embodiment of the present application, the application server 602 is further configured to: when transmitting the media information output by the application client running in the operating terminal 601 to the application client currently running in any target terminal for output, simultaneously and synchronously transmit application content output by the application client running in the operating terminal 601 to the application client currently running in any target terminal for output, where the application client currently running in any target terminal and the application client running in the operating terminal 601 have the same type.

In the embodiment of the present application, the application content output by the application client includes a video, a file, a picture, music and the like, which is not limited in the embodiment of the present application.

It can be seen that, by implementing the system shown in FIG. 6, not only precise pushing of media information can be achieved, but also media information can be hidden efficiently in time.

Figure 7:
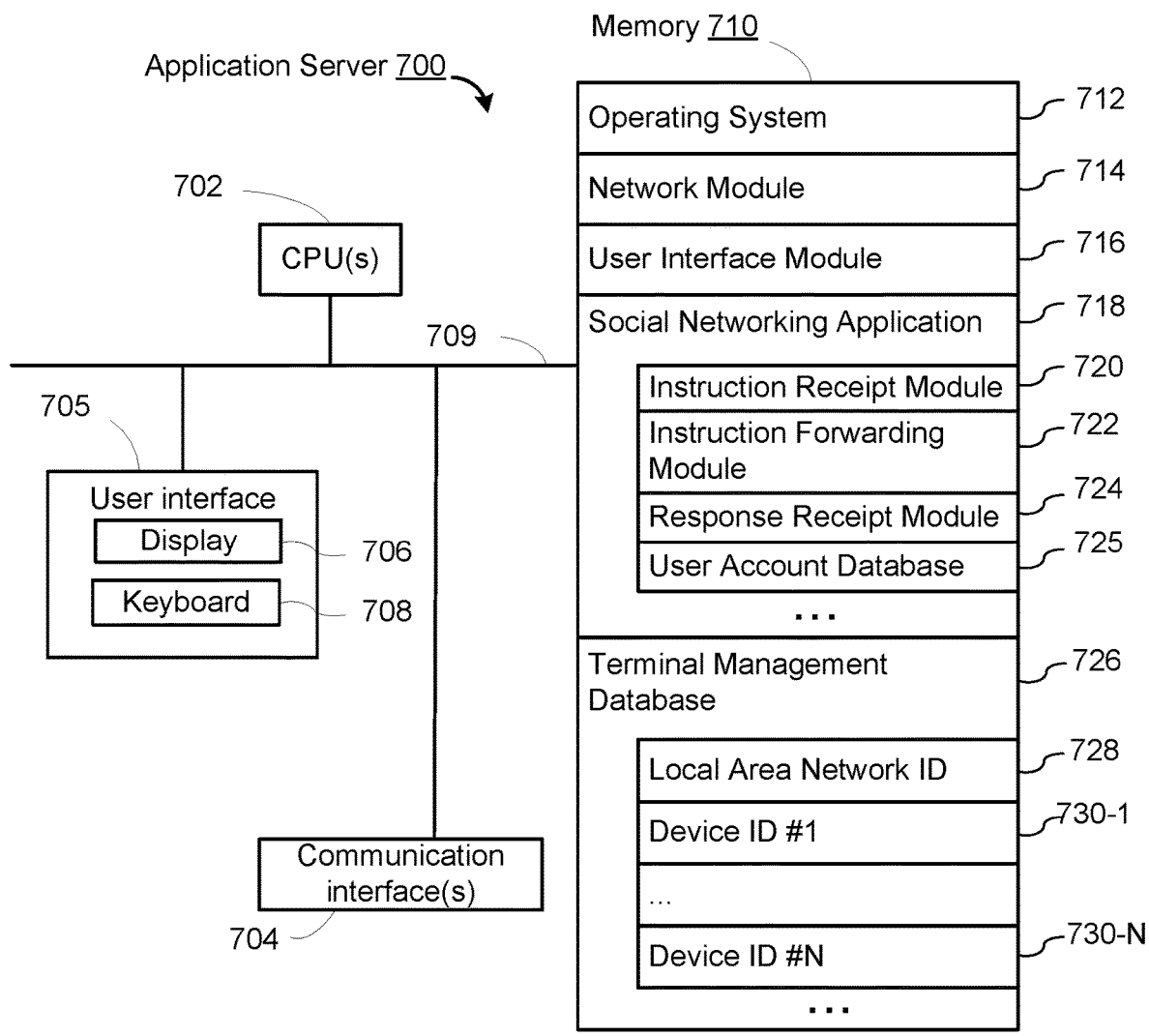
FIG. 7 is a structural diagram of components of an application server according to an embodiment of the present application.

FIG. 7 is a block diagram of an application computer server 700 in accordance with some implementations of the present disclosure. The exemplary computer server 700 typically includes one or more processing units (CPU's) 702, one or more network or communications interfaces 704, memory 710, and one or more communication buses 709 for interconnecting these components and with other computer systems (e.g., the first and second terminals). The communication buses 709 may include circuitry (sometimes called a chipset) that interconnects and controls communications between system components. The computer server 700 may optionally include a user interface 705, for instance, a display 706, and a keyboard 708. Memory 710 may include high speed random access memory and may also include non-transitory computer readable medium, such as one or more magnetic disk storage devices. Memory 710 may include mass storage that is remotely located from the CPU's 702. In some implementations, memory 710 stores the following programs, modules and data structures, or a subset or superset thereof:

- an operating system 712 that includes procedures for handling various basic system services and for performing hardware dependent tasks;
- a network module 714 that is used for connecting the computer server 700 to the client terminals and other computer systems as those shown in FIG. 6 via one or more communication networks (wired or wireless), such as the Internet, other wide area networks, local area networks, metropolitan area networks, and so on;
- a user interface module 716 configured to receive user inputs through the user interface 705;
- a social networking application 718, the social networking application 718 further including:
  - an operation instruction receipt module 720 as described above for receiving operation instructions from an operating terminal, wherein the operating terminal is associated with a first account of the social networking application that has the authority to access one or more target terminals within the same local area network as the operating terminal;
  - an operation instruction forwarding module 722 as described above for forwarding operation instructions to the respective target terminals, each target terminal being associated with a respective second account of the social networking application; in some embodiments, the operation instruction forwarding module 722 is also responsible for recording the current status of the second account and notifying a 3rd-party media server if the service to the target terminals is interrupted by the operating terminal;

a response receipt module 724 as described above for receiving a response from the client terminals including the operating terminal and the target terminals; and a user account database 725 for managing a plurality of user accounts of the social networking application, the database 725 further including information defining the relationship between different user accounts within the same local area network (e.g., a household).

a terminal management database 726 as described above for managing the client terminals within different local area networks; for each network, there is a local area network identifier 728 for uniquely identifying the local area network and multiple device identifiers (730-1, . . . , 730-N) for uniquely identifying terminals (including both operating and target terminals) within the network.

It should be noted that an operating terminal is not necessarily the same physical device within the local area network. In some embodiments, the term "operating terminal" refers to a physical device through which a user logs into the first account of the social networking application or platform and the term "target terminal" refers to a physical device through which a user logs into a respective second account of the social networking application or platform. In other words, a particular physical device could be an operating terminal or a target terminal depending on the status of the account of social networking application as defined in the social networking application 718. In some embodiments, the physical devices do not need to be within one local area network. As long as the social networking application 718 can locate them and perform the operations as described in the present application, the embodiments described above are also applicable. For example, a parent can find out what media content is played at home while on a business trip and take certain actions accordingly with the support of the social networking application 718 running on the server 700.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method comprising:
   at an operating terminal having a display, one or more processors and memory storing programs to be executed by the one or more processors, wherein the operating terminal is communicatively connected to a target terminal within a local area network and a user account of a social networking platform hosted by an application server is logged into the operating terminal, and the user account is also logged into the target terminal:
   detecting, by the operating terminal, an operation of the user to select the target terminal in a target terminal list, the operation of the user includes a gesture;
   displaying, on the target terminal and using a client-side application, information transmitted from the application server to the target terminal;
   detecting, by the operating terminal, a predefined physical movement of the operating terminal by a user of the operating terminal and a user-selected operation;
   in response to detecting the predefined physical movement of the operating terminal by the user, sending, by the operating terminal, an operation instruction to the application server, the operation instruction including a device identifier of the target terminal and an operation identifier of the user-selected operation, wherein the application configured for generating the operation instruction on the operating terminal and the application configured for performing the user-selected operation on the target terminal are the same social networking application associated with the social networking platform;

in response to the operation instruction, transmitting, by the application server, simultaneously an identical copy of the information displayed on the target terminal to the operating terminal; and outputting, on the display of the operating terminal, the information transmitted from the application server synchronously using the client-side application running at the operating terminal.

2. The method of claim 1, wherein the device identifier of the target terminal is returned by the remote server in response to an inquiry to search for target terminals from the operating terminal, and the remote server maintains a list of online terminals within the local area network including the target terminal.

3. The method of claim 1, wherein the operation instruction is to terminate a respective application running on the target terminal and the remote server is configured to record a current status of the application running on the target terminal and terminate the application running on the target terminal.

4. The method of claim 3, wherein the remote server is further configured to send a termination notification to a media server that supports the application running on the target terminal.

5. The method of claim 1, wherein the operation instruction is to share media information currently displayed on the target terminal with the operating terminal and the remote server is configured to synchronize the display of the media information between the target terminal and the operating terminal.

6. An operating terminal comprising:
a display;
one or more processors;
memory coupled to the one or more processors; and
a plurality of operations stored in the memory, wherein the operating terminal is communicatively connected to a target terminal within a local area network and a user account of a social networking platform hosted by an application server is logged into the operating terminal, and the user account is also logged into the target terminal, and the plurality of operations, when executed by the one or more processors, cause the operating terminal to perform a plurality of operations including:
detecting, by the operating terminal, an operation of the user to select the target terminal in a target terminal list, the operation of the user includes a gesture;
while information transmitted from the application server to the target terminal is displayed on the target terminal and using a client-side application:
detecting, by the operating terminal, a predefined physical movement of the operating terminal by a user of the operating terminal and a user-selected operation;
in response to detecting the predefined physical movement of the operating terminal by the user, sending, by the operating terminal, an operation instruction to the application server, the operation instruction including a device identifier of the target terminal and an operation identifier of the user-selected operation, wherein the application configured for generating the operation instruction on the operating terminal and the application configured for performing the user-selected operation on the target terminal are the same social networking application associated with the social networking platform, wherein the application server, in response to the operation instruction, transmits simultaneously an identical copy of the information displayed on the target terminal to the operating terminal; and
outputting, on the display of the operating terminal, the information transmitted from the application server synchronously using the client-side application running at the operating terminal.

7. The operating terminal of claim 6, wherein the device identifier of the target terminal is returned by the remote server in response to an inquiry to search for target terminals from the operating terminal, and the remote server maintains a list of online terminals within the local area network including the target terminal.

8. The operating terminal of claim 6, wherein the operation instruction is to terminate a respective application running on the target terminal and the remote server is configured to record a current status of the application running on the target terminal and terminate the application running on the target terminal.

9. The operating terminal of claim 8, wherein the remote server is further configured to send a termination notification to a media server that supports the application running on the target terminal.

10. The operating terminal of claim 6, wherein the operation instruction is to share media information currently displayed on the target terminal with the operating terminal and the remote server is configured to synchronize the display of the media information between the target terminal and the operating terminal.

11. A non-transitory computer readable storage medium storing a plurality of operations in connection with an operating terminal that is communicatively connected to a target terminal within a local area network and a user account of a social networking platform hosted by an application server is logged into the operating terminal, and the user account is also logged into the target terminal, and the plurality of operations, when executed by the one or more processors, cause the operating terminal to perform a plurality of operations including operating terminal comprising:
detecting, by the operating terminal, an operation of the user to select the target terminal in a target terminal list, the operation of the user includes a gesture;
while information transmitted from the application server to the target terminal is displayed on the target terminal and using a client-side application:
detecting, by the operating terminal, a predefined physical movement of the operating terminal by a user of the operating terminal and a user-selected operation;
in response to detecting the predefined physical movement of the operating terminal by the user, sending, by the operating terminal, an operation instruction to the application server, the operation instruction including a device identifier of the target terminal and an operation identifier of the user-selected operation, wherein the application configured for generating the operation instruction on the operating terminal and the application configured for performing the user-selected operation on the target terminal are the same social networking application associated with the social networking platform, wherein the application server, in response to the operation instruction, transmits simultaneously an identical copy of the information displayed on the target terminal to the operating terminal; and outputting, on the display of the operating terminal, the information transmitted from the application server synchronously using the client-side application running at the operating terminal.

12. The non-transitory computer readable storage medium of claim 11, wherein the device identifier of the target terminal is returned by the remote server in response to an inquiry to search for target terminals from the operating terminal, and the remote server maintains a list of online terminals within the local area network including the target terminal.

13. The non-transitory computer readable storage medium of claim 11, wherein the operation instruction is to terminate a respective application running on the target terminal and the remote server is configured to record a current status of the application running on the target terminal and terminate the application running on the target terminal.

14. The non-transitory computer readable storage medium of claim 13, wherein the remote server is further configured to send a termination notification to a media server that supports the application running on the target terminal.

15. The non-transitory computer readable storage medium of claim 11, wherein the operation instruction is to share media information currently displayed on the target terminal with the operating terminal and the remote server is configured to synchronize the display of the media information between the target terminal and the operating terminal.

* * * * *